US005478294A

United States Patent [19]
Furukawa et al.

[11] Patent Number: 5,478,294
[45] Date of Patent: Dec. 26, 1995

[54] CONTROL APPARATUS FOR HYDRAULICALLY OPERATED VEHICULAR TRANSMISSION

[75] Inventors: Hideo Furukawa; Chihiro Matsubara; Yasuhiro Ijichi, all of Wako, Japan

[73] Assignee: Honda Giken Kogyo Kabushiki Kaisha, Tokyo, Japan

[21] Appl. No.: 266,377

[22] Filed: Jun. 27, 1994

[30]   Foreign Application Priority Data

Aug. 25, 1993  [JP]  Japan .................................. 5-210334

[51] Int. Cl.⁶ ............................ F16H 59/04; F16H 61/02
[52] U.S. Cl. ................................................................ 477/121
[58] Field of Search .................................. 477/121, 131

[56]            References Cited

U.S. PATENT DOCUMENTS

| | | | |
|---|---|---|---|
| 5,067,374 | 11/1991 | Sakai et al. | 477/121 |
| 5,070,746 | 12/1991 | Milunas et al. | 477/121 |
| 5,079,705 | 1/1992 | Sakai et al. | 477/121 |

FOREIGN PATENT DOCUMENTS

| | | | |
|---|---|---|---|
| 0457585A2 | 11/1991 | European Pat. Off. | |
| 63-190960 | 8/1988 | Japan | |
| 4-8962 | 1/1992 | Japan | |

*Primary Examiner*—Dirk Wright
*Attorney, Agent, or Firm*—Armstrong, Westerman, Hattori, McLeland & Naughton

[57]              ABSTRACT

A control apparatus for a hydraulically operated vehicular transmission has a plurality of transmission trains to be established by a selective operation of a plurality of hydraulic engaging elements. The apparatus has a selecting device for selecting a transmission train according to a running condition of a vehicle. The apparatus is provided with a detecting device for detecting a power transmission capability value of the hydraulic engaging elements, and a device for determining a transmission train to be established, based on a detected result of the detecting device and a selected result of the selecting device. The detecting device detects a hydraulic engaging element whose power transmission capability value is above a predetermined value and designates a transmission train that corresponds to the detected hydraulic engaging element. The device for determining the transmission train determines a transmission train to be established, based on the transmission train designated by the detecting device and the transmission train or trains selected by the selecting device.

20 Claims, 5 Drawing Sheets

CONTROL APPARATUS FOR HYDRAULICALLY OPERATED VEHICULAR TRANSMISSION

BACKGROUND OF THE INVENTION

1. Field of the Invention

The present invention relates to a control apparatus for a hydraulically operated vehicular transmission having a plurality of transmission trains to be established by a selective operation of a plurality of hydraulic engaging elements.

2. Description of Related Art

As a control apparatus for this kind of transmission, there is conventionally known the following. Namely, a control apparatus is provided with a hydraulic control circuit for controlling the supply and discharge of hydraulic oil to and from a plurality of hydraulic engaging elements, and an electronic control circuit in which there are stored mapped speed change characteristics to be defined by parameters of an engine load such as a throttle opening degree, and a vehicle speed. By means of the electronic control circuit a transmission train corresponding to the throttle opening degree and the vehicle speed at the present moment is selected, and an order signal is outputted to the hydraulic control circuit. The hydraulic oil is then supplied to the hydraulic engaging element that was selected so as to establish the selected transmission train, thereby effecting an automatic speed changing.

The speed change characteristics define an upshift characteristic line (upshift line) and a downshift characteristic line (downshift line) between respective two transmission trains that are next to each other in the order of speed. In the hysteresis region between the upshift line and the downshift line it becomes possible to establish both transmission trains on the low-speed side and the high-speed side. Especially, there is recently a tendency of enlarging the region in which the high-speed transmission trains can be established in order to improve the specific fuel consumption. In this case, if the speed change characteristics as shown in FIG. 2 are employed, there will be a region in which three or more transmission trains can be established. It becomes therefore difficult to judge which transmission train should be established.

In order to solve this problem, there is known, as in Japanese Published Unexamined Patent Application No. 190960/1988, an art in which the following procedure is followed. Namely, the speed change characteristics and the throttle opening degree as well as the vehicle speed at the present moment are compared, and the lowest speed transmission train SL that can be established and the highest speed transmission train SH that can be established from the viewpoint of speed change characteristics are picked up. When the speed of the presently established transmission train SO is in the relationship $SL \leq SO \leq SH$, the transmission train SO is continued to be established, and when $SO<SL$, upshifting is effected from SO to SL, and when $SO>SH$, downshifting is effected from SO to SH.

In this prior art, when the running condition changes, while running at the fifth speed at point A in FIG. 2, sequentially to points B, C, D, E and F by increasing the depression of an accelerator pedal, the fifth speed will be maintained at point B because SL=the fourth speed, SH=the fifth speed and $SL \leq SO \leq SH$. The fifth speed will be maintained at point C because SL=the third speed, SH=the fifth speed and similarly $SL \leq SO \leq SH$. At point D, downshifting from the fifth speed to the third speed will be effected because SL=SH=the third speed and SO>SH. At point E, the third speed will be maintained because SL=the second speed, SH=the third speed and $SL \leq SO \leq SH$. At point F, downshifting from the third speed to the second speed will be effected because SL=the first speed, SH=the second speed and SO>SH. Then, when the running condition sequentially moves from point F to points E, D, C, B and A by releasing or decreasing the depression of the accelerator pedal, the second speed will be maintained at point E because $SL \leq SO \leq SH$. At point D, upshifting from the second speed to the third speed will be effected because SO<SL. At point C, the third speed will be maintained because $SL \leq SO \leq SH$. At point B, upshifting from the third speed to the fourth speed will be effected because SO<SL. At point A, upshifting to the fifth speed will be effected because SO< SL=SH.

Normally, there will exist a time lag from the time at which the supply of the hydraulic oil is started to the time at which the hydraulic engaging elements come into substantial engagement. Here, in case the running condition transfers from point A to point D in FIG. 2, thereby starting the downshifting to the third speed, and thereafter immediately transfers to point B, upshifting to the fourth speed will be effected before the hydraulic engaging element for the third speed comes into substantial engagement. It follows that the amount of transmission of the driving force decreases until the hydraulic engaging element for the fourth speed has come into substantial engagement. At this time, the hydraulic engaging element for the fifth speed still has some hydraulic pressure left therein because only a short time has lapsed from the point of time of downshifting to the third speed. Therefore, if an upshifting is made to the fifth speed that can be established at point B, the hydraulic engaging element for the fifth speed will quickly be brought into engagement, with the result that the interval from the time of downshifting to the third speed to the time at which the driving force is sufficiently transmitted becomes short. In the above-described prior art, however, there will be effected only the upshifting to the fourth speed when the running condition has transferred from point D to point B. Therefore, a relatively long time is required until the driving force is sufficiently transmitted, resulting in a poor drivability.

SUMMARY OF THE INVENTION

In view of the above points, the present invention has an object of providing a control apparatus in which a transmission train to be established is determined also taking into consideration the conditions of each of the hydraulic engaging elements so as to improve the drivability of a vehicle.

In order to attain the above-described and other objects, the present invention is a control apparatus for a hydraulically operated vehicular transmission having a plurality of transmission trains to be established by a selective operation of a plurality of hydraulic engaging elements, the control apparatus having selecting means for selecting a transmission train according to a running condition of a vehicle. The control apparatus comprises detecting means for detecting a power transmission capability value of each of the hydraulic engaging elements, and transmission train determining means for determining a transmission train to be established, based on a detected result of the detecting means and a selected result of the selecting means.

In this case, it is preferable to arrange such that the selecting means compares speed change characteristics to be defined with an engine load and a vehicle speed as parameters and a present engine load and a present vehicle speed and selects one or a plurality of transmission trains that can be established from a viewpoint of the speed change characteristics, that the detecting means detects a hydraulic engaging element whose power transmission capability value is above a predetermined value and designates a transmission train that corresponds to the detected hydraulic engaging element, and that the transmission train determining means determines a transmission train to be established based on the transmission train designated by the detecting means and the transmission train or trains selected by the selecting means.

If an arrangement is made such that, at the time of speed change judgement in which a transmission train or trains which are different from a presently established transmission train have been selected by the selecting means, if there is a coinciding transmission train that coincides with the transmission train designated by the detecting means among the selected transmission trains, the transmission train determining means determines the coinciding transmission train as a transmission train to be established, there are the following advantages. Namely, for example, when the running condition transfers, while running at the fifth speed at point A in FIG. 2, to point D to downshift to the third speed and then immediately transfers to point B, the transmission trains to be selected by the selecting means at point B will be the fourth speed train and the fifth speed train. On the other hand, since the hydraulic engaging element of the fifth speed is still short in time from the point of time of downshifting to the third speed, the hydraulic engaging element thereof is still high in power transmission capability value and, consequently, the fifth-speed transmission train is designated by the detecting means. The fifth speed train is thus determined to be the transmission train to be established by the transmission train determining means. According to this arrangement, the hydraulic engaging element for the fifth speed is quickly engaged through the hydraulic oil supply thereto. The duration of time in which the amount of power transmission is decreased becomes shorter than the case in which upshifting to the fourth speed is made at point B. As a result, the drivability is improved.

At the time of speed change judgement for upshifting, if there are a plurality of coinciding transmission trains, it is preferable to determine a lowest speed transmission train among the coinciding transmission trains as a transmission train to be established. Further, at the time of speed change judgement for downshifting, if there are a plurality of coinciding transmission trains, it is preferable to determine a highest speed transmission train among the coinciding transmission trains as a transmission train to be established.

It is preferable that the following arrangement be made, namely, at the time of speed change judgement in which transmission trains which are different from a presently established transmission train have been selected by the selecting means, if there is no transmission train coinciding with the transmission train that has been designated by the detecting means among the selected transmission trains and if the presently established transmission train or an intermediate transmission train between the presently established transmission train and the selected transmission train has been designated by the detecting means, the transmission train that has been designated by the transmission train determining means is determined as a transmission train to be established. Then, for example, if the running condition transfers, while running at the third speed at point D, to point A to thereby start upshifting to the fifth speed, and thereafter immediately transfers to point F, the transmission trains to be selected by the selecting means become the first speed train and the second speed train, and the transmission train to be designated by the detecting means becomes the third speed train. The transmission train to be established by the transmission train determining means is thus determined as the third speed train. Therefore, the time at which the amount of power transmission decreases becomes shorter than the case in which the downshifting to the second speed is made at point F. As a result, the drivability is improved.

In this case, in order for a transmission train that is as close as possible to the transmission train to be selected by the selecting means, if, at the time of speed change judgement for upshifting, the designated transmission train is present in a plurality of numbers, it is preferable to determine a highest speed transmission train among the designated transmission trains as a transmission train to be established. Also, if, at the time of speed change judgement for downshifting, the designated transmission train is present in a plurality of numbers, it is preferable to determine a lowest speed transmission train among the designated transmission trains as a transmission train to be established.

Furthermore, in order to prevent the deterioration of specific fuel consumption and overrunning of the engine, it is preferable to prohibit the determination of a lowest speed transmission train by the transmission train determining means as long as the selecting means has not selected the lowest speed transmission train of the transmission.

By the way, the transmission train may be decided as described above by taking into consideration, the detected result of the detecting means from the beginning when the speed change judgement by the selecting means is made. In such an arrangement, however, even if the accelerator pedal is depressed while running, for example, at the fifth speed at point A to transfer to point D, thereby downshifting to the third speed to accelerate the vehicle, the transmission train to be designated, at the time of transferring to point D, by the detecting means becomes the fifth speed train. As a result, the transmission train to be established is determined to be the fifth speed and, therefore, can no longer be downshifted to the third speed. In this case, if an arrangement is made such that a transmission train to be established is determined based on the selected result of the selecting means until a predetermined time has lapsed from the time of speed change judgement by the selecting means, the third speed train that is selected by the selecting means at the time of speed change judgement by transferring to point D is determined as the transmission train to be established. It follows that downshifting can be made to the third speed as intended by a driver of the vehicle.

Further, in the determination of the transmission train by considering the detected result of the detecting means, if a transmission train not selected by the selecting means has been determined as the transmission train to be established, it will be against the driver's intention if this transmission train is kept established for an undue period of time. Here, it is for the purpose of shortening the period of decreased amount of power transmission that the determination is made of the transmission train taking into consideration the detected result of the detecting means. Accordingly, if a substantial power transmission can be made by the determined transmission train, the determination of the transmission train by considering the detected result of the detecting means may be stopped. Therefore, it is preferable to stop the determination of a transmission train based on the detected result of the detecting means and the selected result of the selecting means at a predetermined time point (or timing) after the speed change judgement by the selecting means, e.g., after a lapse of a predetermined time from the time of speed change judgement or at a time when slipping of the hydraulic engaging element for the presently established transmission train through the determination as described above has decreased below a predetermined value and, instead, to determine the transmission train based on the selected result of the selecting means. Further, when speed changing for downshifting has been made before the lapse of a predetermined set time from the time of the speed change judgement, a longer time will be required, due to the increase in the engine load, before the hydraulic engaging element is engaged. Therefore, it is preferable to delay the timing of stopping the determination of the transmission train based on the detected result of the detecting means and the selected result of the selecting means.

The power transmission capability value of the hydraulic engaging elements, which serves as a parameter in judging in the detecting means, may be a value corresponding to a hydraulic oil pressure that operates on the hydraulic engaging element or a value corresponding to a response time for the hydraulic engaging element to transfer to an engaged condition in which the driving power can be transmitted thereby.

In this case, the hydraulic oil pressure of the hydraulic engaging elements may be actually detected by means of a hydraulic oil pressure sensor. However, since the hydraulic pressure increases with the lapse of time when the hydraulic oil is supplied to the hydraulic engaging element and decreases with the lapse of time when it is discharged, it may be so arranged that the power transmission capability value of the hydraulic engaging element is a value that increases with the lapse of time at a predetermined rate with respect to a hydraulic engaging element for a presently established transmission train, i.e., the hydraulic engaging element that is being supplied with the hydraulic oil at the present moment and is consequently transferring to the engaged condition or has already been engaged, and a value that decreases with the lapse of time at a predetermined rate with respect to a hydraulic engaging element for a transmission train that is not presently established, i.e., the hydraulic engaging element from which the hydraulic oil is being discharged and is consequently transferring to the non-engaged condition or has already been disengaged. According to this arrangement, it is advantageous in that the hydraulic oil pressure sensor becomes needless. By the way, since the hydraulic oil pressure in the hydraulic engaging elements does not rise above a basic pressure (supply pressure) of the hydraulic oil to be supplied to the hydraulic engaging elements and since the hydraulic oil pressure does not fall below atmospheric pressure, it is preferable to set an upper limit value and a lower limit value of the power transmission capability value that increases or decreases with the lapse of time. Further, in case there is provided hydraulic control means which controls a supply pressure of the hydraulic oil to be supplied to the hydraulic engaging elements, it is preferable to variably set the upper limit value according to a control condition of the hydraulic control means.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
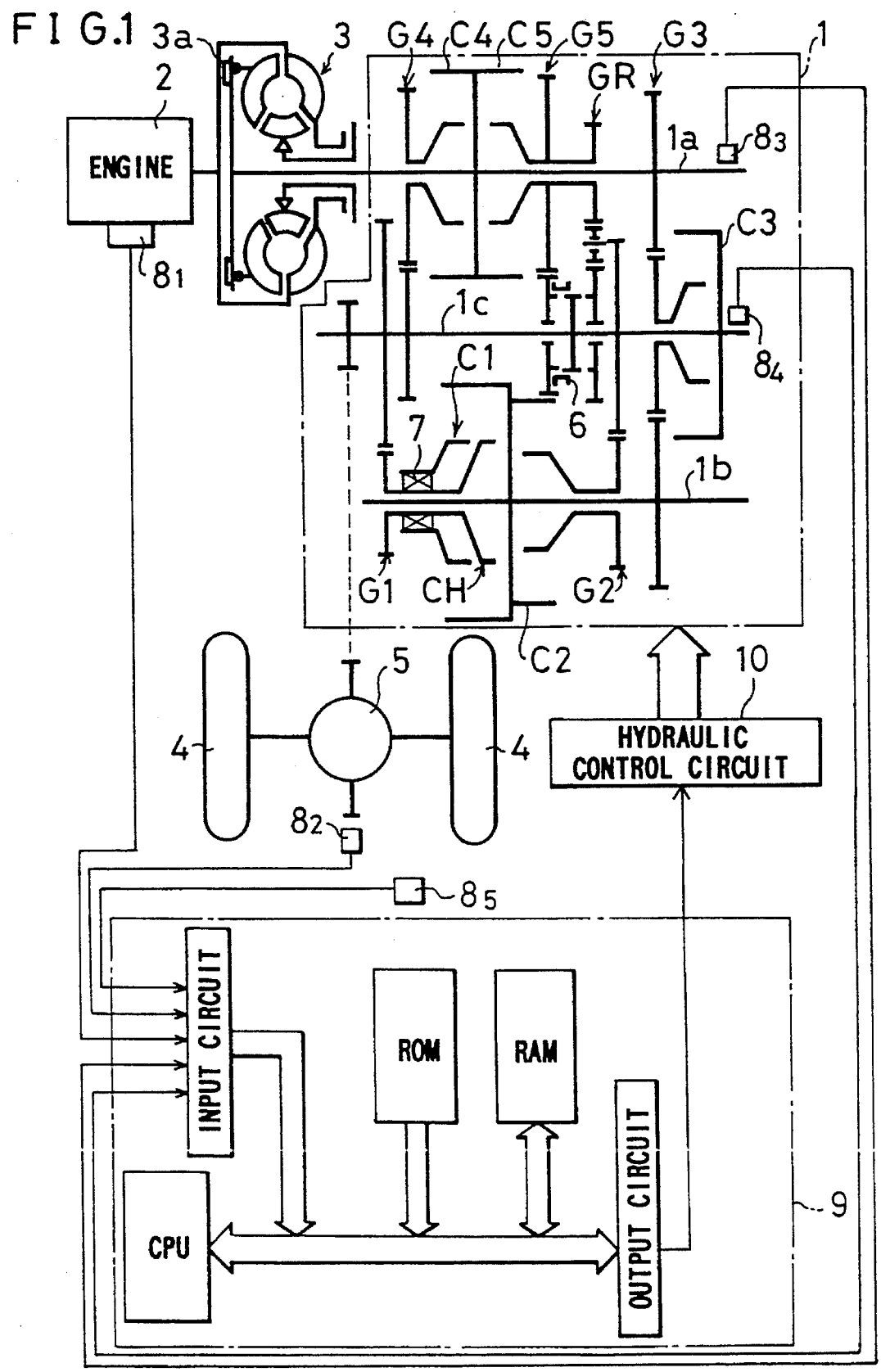
FIG. 1 is a system diagram showing a transmission and a control system in which the present invention is applied.

Referring to FIG. 1, numeral 1 denotes a transmission for effecting the changing or shifting of a vehicle speed to five forward speeds and one reverse speed. The transmission 1 is provided with a first input shaft $1a$ which is connected to an engine 2 via a fluid torque converter 3 having a clutch $3a$, a second input shaft $1b$ which rotates synchronously with the first input shaft $1a$, and an output shaft $1c$ which is connected to driving wheels 4 of a vehicle via a differential gear 5. Between the second input shaft $1b$ and the output shaft $1c$ there are parallelly provided first-speed and second speed forward transmission trains G1, G2. Between the first input shaft $1a$ and the output shaft $1c$ there are parallelly provided third-speed through fifth-speed forward transmission trains G3, G4, G5 and a reverse transmission train GR. In each of these forward transmission trains there is interposed a hydraulic engaging element in the form of first-speed through fifth-speed hydraulic clutch C1, C2, C3, C4, C5 so that each of the forward transmission trains can be selectively established through the engagement of each of the hydraulic clutches. The reverse transmission train GR is arranged to use the fifth-speed hydraulic clutch C5 in common with the fifth-speed transmission train G5. The fifth-speed transmission train G5 and the reverse transmission train GR can selectively be established by changing over a selector gear 6 on the output shaft $1c$ to the forward position on the left-hand side in FIG. 1 and to the reverse position on the right-hand side therein. The second input shaft $1b$ is connected, via a gear, to the gear train of the third-speed transmission train on the input side of the third-speed hydraulic clutch C3 which is provided on the output shaft $1c$, and synchronously rotates with the first input shaft $1a$.

In the first-speed transmission train G1 there is provided a one-way clutch 7 which allows for over-rotation of the output side and which is interposed between the first-speed hydraulic clutch C1 and the first-speed gear train on the output side thereof. Further, inside the first-speed hydraulic clutch C1 there is assembled a first-speed holding hydraulic clutch CH which directly connects the output side thereof to the first-speed gear train. It is thus so arranged that the first-speed transmission train G1 can be established in a condition in which, through the engagement of this first-speed holding hydraulic clutch CH, the overrotation of the output side is not allowed, i.e., in a condition in which the engine brake can be applied.

There are provided an electronic control circuit 9 which is made up of a microcomputer for receiving input signals from an engine sensor $8_1$ which detects a throttle opening degree, a revolution speed, a cooling water temperature, or the like of the engine 2, a vehicle speed sensor $8_2$ which detects the vehicle speed based on the revolution speed of the differential gear 5, revolution speed sensors $8_3$, $8_4$ which detect the revolution speeds of the input shaft and the output shaft of the transmission 1, and a position sensor $8_5$ which detects the position of an unillustrated shift lever, as well as a hydraulic control circuit 10 for controlling the above-described hydraulic clutches. It is thus so arranged that unillustrated solenoid valves, which are assembled into the hydraulic control circuit 10, can be controlled by the electronic control circuit 9 to effect the speed changing.

Figure 2:
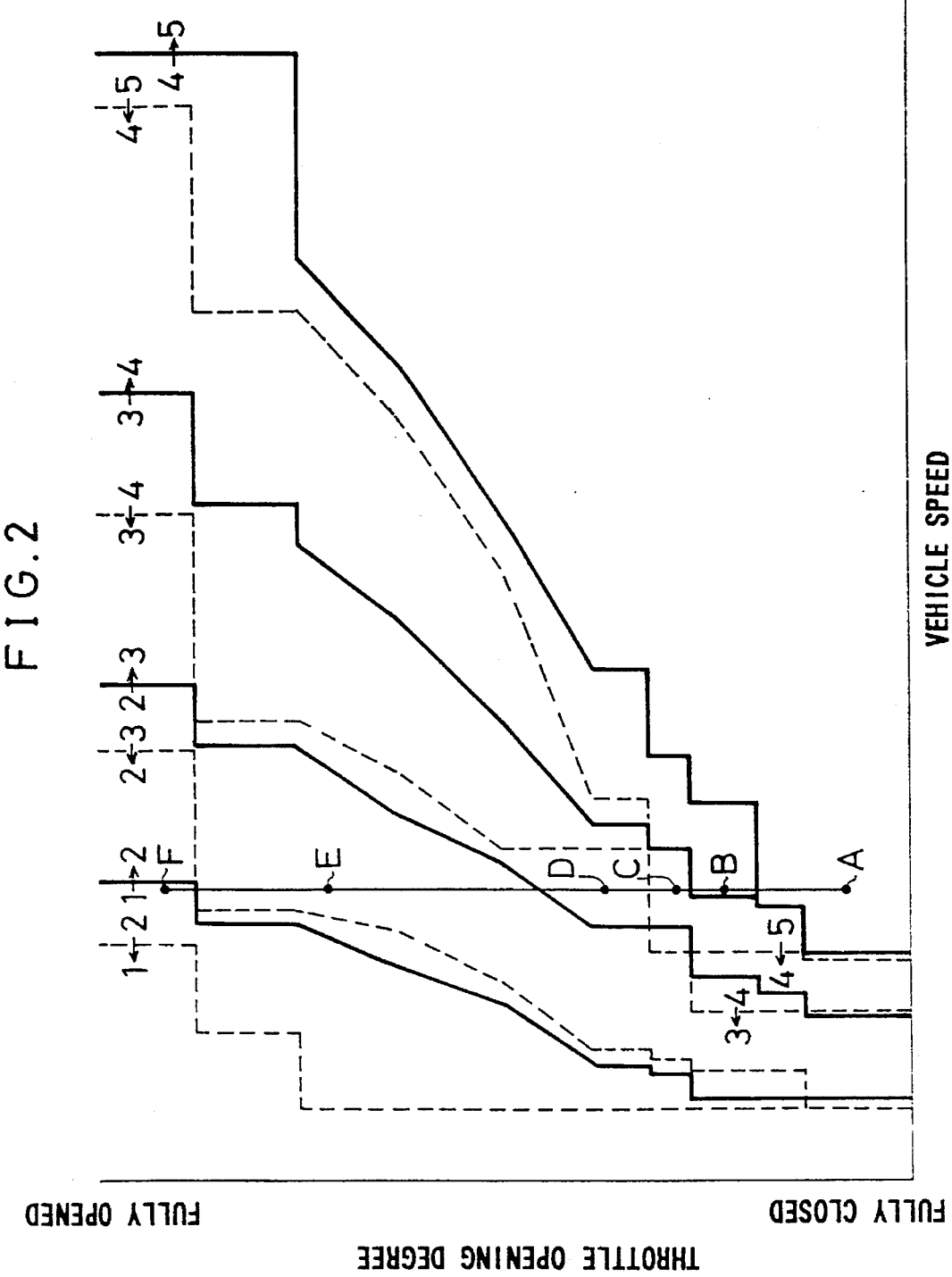
FIG. 2 is a graph showing speed change characteristics.

In the electronic control circuit 9 there are stored mapped speed change characteristics, as shown in FIG. 2, which are represented by parameters of the throttle opening degree which is the engine load, and the vehicle speed. When the shift lever is changed over to the "D" range which is for automatic speed changing, a comparison is made between the speed change characteristics and the throttle opening degree as well as the vehicle speed at the present moment to carry out the following two treatments, i.e., a selecting treatment in which the transmission trains that can be established from the viewpoint of the speed change characteristics are selected and a detecting treatment in which the power transmission capability value at the present moment (the present power transmission capability value) of each of the first-speed through the fifth-speed hydraulic engaging elements is detected and in which transmission trains that correspond to the hydraulic engaging elements whose power transmission capability values are above a predetermined value are designated. The transmission train to be established is thus determined based on the selected result of the selecting treatment and the detected result of the detecting treatment, so that an appropriate automatic speed changing can be made depending on the running condition of the vehicle.

In the selecting treatment, transmission trains of the lowest speed SL and the highest speed SH that can presently be established from the viewpoint of the speed change characteristics are selected. A comparison is also made between the transmission train that is presently established, i.e., the transmission train SO for which an order of establishing is presently being issued, and SL and SH. A tentative transmission train to be established next is called Smap. When SL=SH, i.e., when there is only one transmission train that can be established, that particular transmission train is selected. When SL≦SO≦ SH, SO is selected and, when SO<SL, SL is selected and, when SO>SH, SH is selected, respectively. For example, when the running condition has transferred to point C while running at the fifth speed at point A in FIG. 2, the following applies, i.e., SL=the third speed, SH=the fifth speed and the Smap=the fifth speed.

The power transmission capability value of each of the hydraulic clutches C1 through C5 is defined to be the value which corresponds to a response time in which the hydraulic clutch concerned transfers to a condition in which it is capable of transmitting the driving force. If a hydraulic oil pressure operating on a hydraulic clutch (i.e., a clutch pressure) is high, the response time for the hydraulic clutch to transfer to the condition of engagement becomes short and the power transmission capability value becomes high. In this case, the clutch pressure of each hydraulic clutch may be detected by a hydraulic oil pressure sensor, but it will result in a higher cost. Therefore, in the present embodying example, the following arrangement has been employed by taking note of the change, with the lapse of time, of the clutch pressure through supply and discharge of the hydraulic oil to and from the hydraulic clutch. Namely, the above-described detecting treatment is made based on a value which increases with the lapse of time with respect to the hydraulic clutch for the presently established transmission train SO, i.e., the hydraulic clutch that is being supplied with the hydraulic oil at the present moment and is consequently transferring to the engaged condition or has already been engaged, and based on a value which decreases with the lapse of time with respect to the hydraulic clutch for the transmission train that has not been established yet, i.e., the hydraulic clutch from which the hydraulic oil is being discharged and is consequently transferring to the non-engaged condition or has already been disengaged (the above-described values are hereinafter referred to as clutch pressure timers TC).

Figure 3:
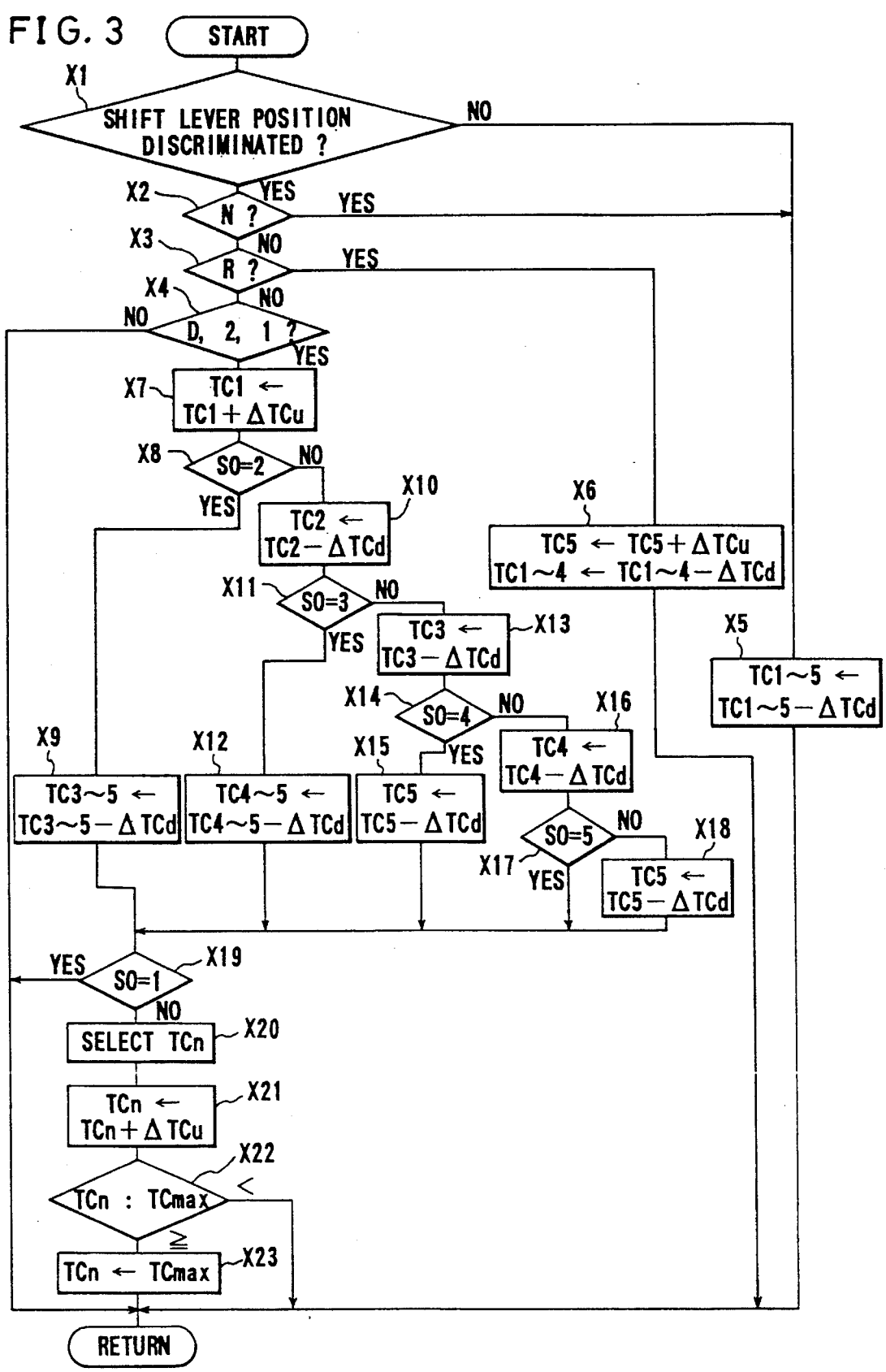
FIG. 3 is a flow chart showing the program for setting clutch pressure timers which are power transmission capability values of hydraulic engaging elements.

The setting program for the clutch pressure timer TC is as shown in FIG. 3. At step X1, a discrimination or distinction is made as to whether the shift lever is duly in one of the changeover positions of "R" range for reverse running, "N" range for neutral, "D" range for automatic speed changing, "2" range for the second speed holding and "1" range for the first speed holding. If the shift lever is duly in one of the above-described positions, a discrimination is made at steps X2, X3 and X4 as to whether the range is in the "N" range or not, whether the range is in the "R" range or not, and whether the range is in the forward "D", "2" or "1" range or not, respectively. If the shift lever is in an intermediate indefinite position between the respective changeover positions or in the "N" range, the program proceeds to step X5 to thereby decrease, with the lapse of time, the clutch pressure timers TC1–TC5 for the first speed through the fifth speed at a predetermined rate of ΔTCd.

When the shift lever is in the "R" range, the reverse transmission train GR is established by supplying the hydraulic oil to the fifth-speed hydraulic clutch C5. Therefore, at step X6, the fifth-speed clutch pressure timer TC5 is increased with the lapse of time at a predetermined rate of ΔTCu and, also, the first-speed through the fourth-speed clutch pressure timers TC1–TC4 are decreased with the lapse of time at the predetermined rate of ΔTCd.

When the shift lever is in the forward running "D", "2" or "1" range, the first-speed hydraulic clutch C1 is always supplied with the hydraulic oil. Therefore, at step X7, the first-speed clutch pressure timer TC1 is increased with the lapse of time at the predetermined rate of ΔTCu. Thereafter, the program proceeds to step X8 to discriminate whether the presently established transmission train SO is the second speed or not. If SO= the second speed, the third-speed through the fifth-speed clutch pressure timers TC3– TC5 are decreased with the lapse of time at the predetermined rate of ΔTCd at step X9. If SO≠the second speed, the second-speed pressure timer TC2 is similarly decreased at step X10 and., also, the program proceeds to step X11, where a discrimination is made as to whether SO is the third speed or not. If SO= the third speed, the program proceeds to step X12, where the fourth-speed and the fifth-speed clutch pressure timers TC4, TC5 are similarly decreased. If SO≠the third speed, the third-speed clutch pressure timer TC3 is similarly decreased at step X13 and, also, the program proceeds to step X14, where a discrimination is made as to whether SO is the fourth speed or not. If SO=the fourth speed, the fifth-speed clutch pressure timer TC5 is similarly decreased at step X15. If SO≠the fourth speed, the fourth-speed clutch pressure timer TC4 is similarly decreased at step X16 and, also, the program proceeds to step X17, where a discrimination is made as to whether SO is the fifth speed or not. If SO≠the fifth speed, the fifth-speed clutch pressure timer TC5 is similarly decreased at step X18.

In this manner, the clutch pressure timers for the transmission trains that have not presently been established are decreased with the lapse of time at the predetermined rate of ΔTCd. Thereafter, the program proceeds to step X19, where a discrimination is made as to whether SO is the first speed or not. If SO≠the first speed, a clutch pressure timer TCn which corresponds to the transmission train SO is selected at step X20 and, at step X21, the clutch pressure timer Tcn is increased with the lapse of time at the predetermined rate of ΔTCu. The clutch pressure does not rise above a basic pressure (supply pressure) of the hydraulic oil to be supplied to the hydraulic clutches. Therefore, an upper limit value TCmax corresponding to the supply pressure is defined, and a comparison is made at step X22 between TCn and. TCmax. If TCn≥TCmax, TCn is re-written to TCmax at step X23.

By the way, there is a case in which the hydraulic control circuit 10 is provided with a hydraulic control valve (not illustrated) which is controlled by the electronic control circuit 9 to variably change, by the control valve, the supply pressure of the hydraulic oil to the hydraulic clutches depending on the throttle valve opening degree or the like. In such a case, the above-described upper limit value TCmax is variably set by deriving the supply pressure from an order value to the hydraulic control valve. Further, there is a case in which, during the transient period of speed changing, pressure rise characteristics of the clutch pressure are feedback-controlled based on revolution speed parameters such as a ratio of revolution speeds of the input shaft and the output shaft of the transmission, a rate of change in revolution speed of the input shaft, or the like. At the time of this feedback control, the rate of increase ΔTCu of TCn is made to be variable depending on the pressure increase characteristics of the clutch pressure.

An upper limit value is also set against the increase in the fifth-speed clutch pressure timer TC5 at step X6 and the increase in the first-speed clutch pressure timer TC1 at step X7. On the other hand, against the decrease in the clutch pressure timer in each of the steps X5, X6, X9, X10, X12, X13, X15, X16 and X18, a value corresponding to atmospheric pressure, e.g., zero, is set as a lower limit value.

As in the above-described manner, the clutch pressure timer TC1–TC5 for each of the hydraulic clutches C1–C5 is set. In the above-described detecting treatment, the hydraulic clutch or clutches whose clutch pressure timer or timers are above a predetermined value TCs are detected and transmission train or trains STC corresponding to those hydraulic clutches are designated.

Figure 4:
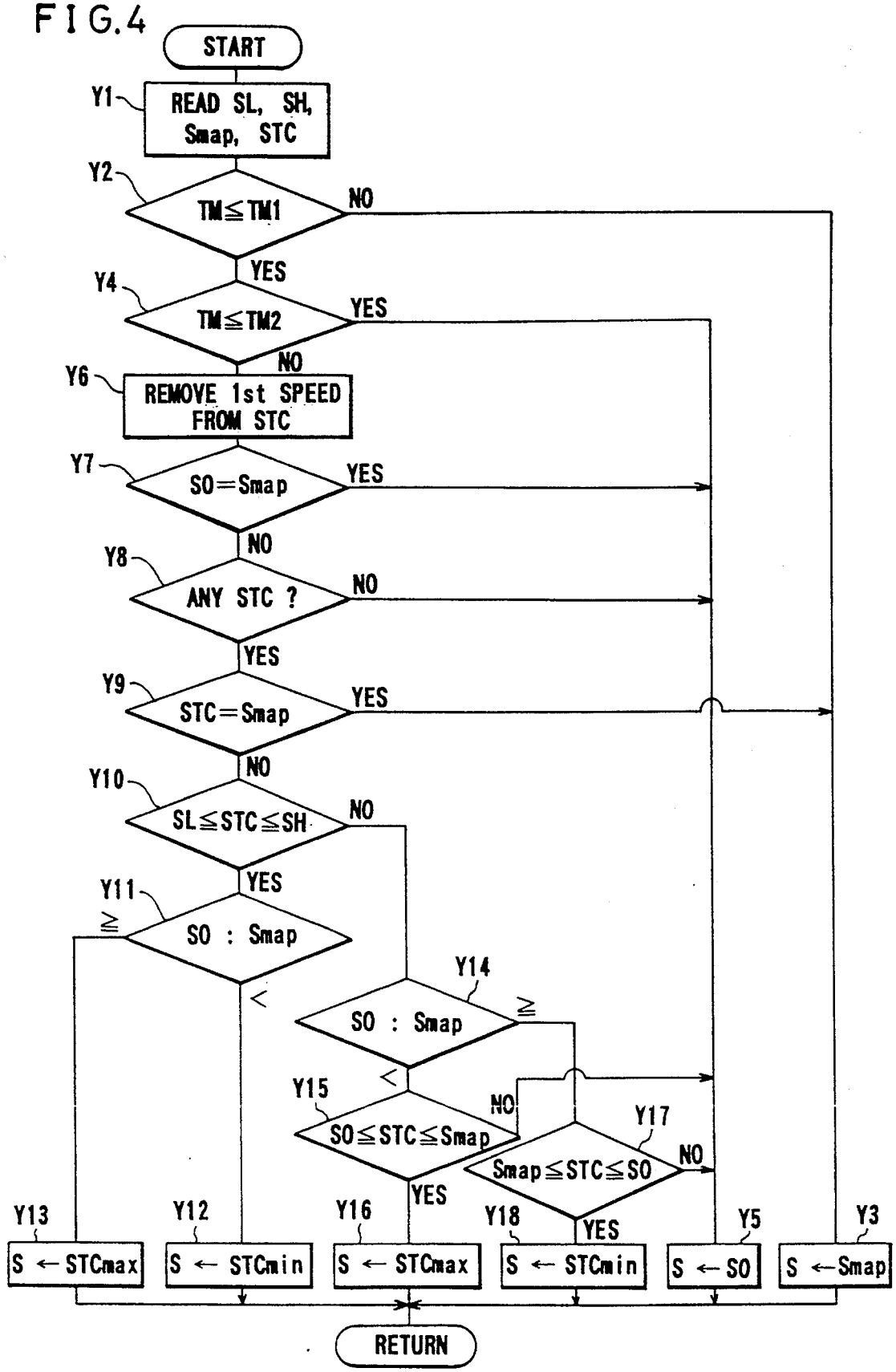
FIG. 4 is a flow chart showing the program for determining the transmission train.

FIG. 4 shows a program for deciding a transmission train to be effected in the "D" range. First, at step Y1, reading is made of the above-described SL, SH, Smap that were selected in the selecting treatment and the above-described STC that was designated in the detecting treatment. Then, at step Y2, a discrimination is made as to whether or not a timer time TM of a speed change timer of subtraction type has become smaller than a predetermined first setting time TM1. If TM>TM1, the transmission train S to be established next is determined at step Y3 to be the transmission train of Smap. If TM≦ TM1, a discrimination is made at step Y4 as to whether TM has become smaller than a second setting time TM2 which is set to a value smaller than the first setting time TM1. If TM≦TM2, the transmission train S to be established next is determined at step Y5 to be the presently established transmission train SO.

The timer time TM of the speed change timer is set to an initial value TMS (TMS>TM1) at the time of speed change judgement when, at the time of TM=0, Smap has become a transmission train other than SO, and when the shift lever has been changed over from an indefinite position to any of the changeover positions. The timer time TM is reset to 0 when a condition of TM=TM2 has occurred, and it is further set again to TM1 when, at the time of TM1>TM>TM2, a speed changing of downshifting is effected. Furthermore, a slip ratio ECL of the hydraulic clutch for the present transmission train is obtained from the revolution speed Nin of the first input shaft, the revolution sped Nout of the output shaft of the transmission 1, and the gear ratio r of the present transmission train by the following formula (ECL=1 when the hydraulic clutch is completely engaged):

$$ECL = r \times Nout \div Nin$$

If ECL falls within a predetermined region close to 1 for a certain period of time t at the time of TM1>TM> TM2, a judgement is made to be the completion of the speed changing, and TM is then reset to 0 even if TM>TM2.

If TM1>TM>TM2, a determination of the transmission train is made, as hereinbelow described, based on Smap, SL, SH and STC. In the "D" range, however, the first-speed clutch pressure timer TC1 always: exceeds the predetermined value TCs as described above, with the result that STC always includes the first speed. Consequently, the frequency at which the transmission train S to be established is determined to be the first speed becomes so high that a disadvantage occurs: in that the specific fuel consumption becomes poor. Therefore, at step Y6, a treatment is made first to remove the first speed from STC. Then, a discrimination is made at step Y7 as to whether the present transmission train SO and Smap coincides with each other. If SO=Smap, the transmission train S to be established next is determined to be the present transmission train SO at step Y5. If SO≠Smap, a discrimination is made at step Y8 as to whether there is STC or not. If there is no STC, the program proceeds to step Y5 similarly as above to make S=SO. If there is or are STC, a discrimination is made at step S9 as to whether there is in STC a transmission train coinciding with Smap. If there is one, the program proceeds to step Y3 to make S= Smap and, if there is none, a discrimination is made at step Y10 as to whether there is in STC a transmission train within a range equal to or above SL and equal to or below SH. If there is one, a comparison is made at step Y11 between SO and Smap to discriminate whether to upshift or to downshift. If a discrimination of upshifting has been made when SO<Smap, the program proceeds to step Y12, and a treatment of S=STCmin is made, where STCmin is the lowest speed transmission train among STC which are equal to or above SL and equal to or below SH. If a discrimination of downshifting has been made at step Y11 when SO≧Smap, the program proceeds to step Y13, and a treatment of S=STCmax is made, where STCmax is the highest speed transmission train among STC which are equal to or above SL and equal to or below SH.

If there is no such transmission train among STC as is equal to or above SL and equal to or below SH, a comparison is made at step Y14 between SO and Smap. If a discrimination of upshifting has been made when SO<Smap, the program proceeds to step Y15 to discriminate as to whether there is such a transmission train among STC as is equal to or above SO and equal to or below Smap. If there is none, a treatment is made to make S=SO at step Y5. If there is one, the program proceeds to step Y16 and a treatment is made to make S=STC max, where STCmax is the highest speed transmission train among STC which are equal to or above SO and equal to or below Smap. If a discrimination of downshifting has been made when SO≧ Smap, the program proceeds to step Y17 and a discrimination is made as to whether there is such a transmission train among STC as is equal to or above Smap and equal to or below SO. If there is none, a treatment is made at step Y5 to make S=SO. If there is one, the program proceeds to step Y18 and a treatment is made to make S=STCmin, where STCmin is the lowest speed transmission train among STC which are equal to or above Smap and equal to or below SO.

Figure 5:
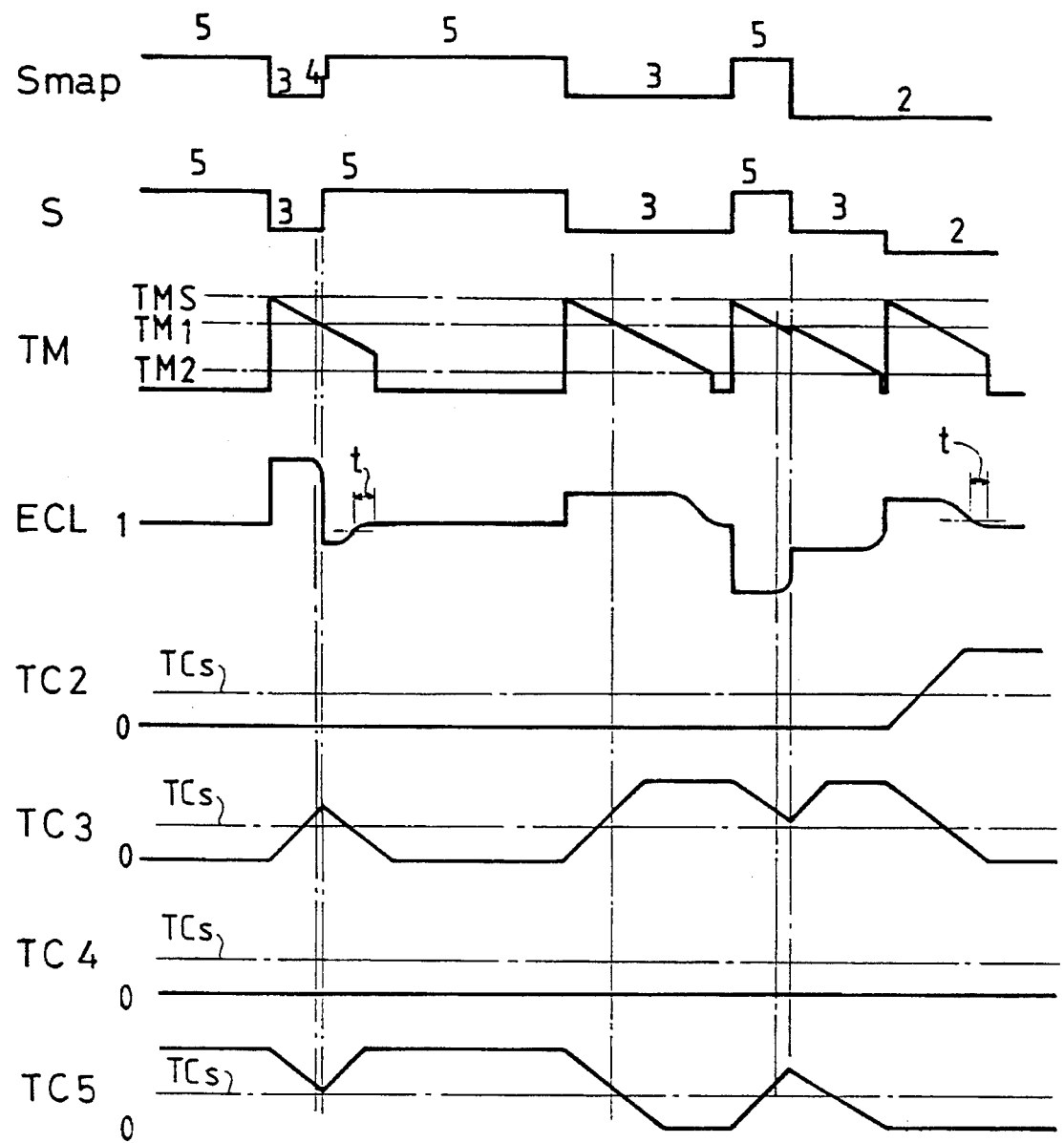
FIG. 5 is a time chart showing the sped changing which is carried out by the program shown in FIG. 4.

An explanation will now be made, with reference to FIG. 5, about the speed changing by the above-described discriminating treatment. When the running condition transfers to point D while running at the fifth speed at point A in FIG. 2, since SL=SH=Smap=the third speed at point D, a condition of SO≠Smap occurs, as a result of which TM is set to TMS. While TM>TM1, the program proceeds from step Y2 to step Y3 to make S=the third speed, thereby downshifting from the fifth speed to the third speed. When a condition of TM1≧TM>TM2 occurs, as long as the running continues at point D, the program proceeds from step Y7 to step Y5, thereby maintaining the vehicle speed to the third speed. However, when the running condition transfers from point D to point B and a condition occurs in which SL=Smap=the fourth speed and SH=the fifth speed, a discrimination is made at step Y7 that SO≠Smap, and the program proceeds to step Y8 to make a discrimination as to whether there is STC or not. Since TC3 and TC5 respectively exceed the predetermined value TCs in a condition shown in FIG. 5, the third speed and the fifth speed are designated as STC. The program proceeds from step Y8 to step Y10 via step Y9. In this case, since STC=SH=the fifth speed, the program proceeds to step Y11, where a discrimination is made that SO<Smap and proceeds to step Y12. In this case, since the STC that satisfies the condition of SL≦STC≦SH is only the fifth speed, STCmin=the fifth speed. Therefore, as a result of S=the fifth speed, an upshifting is effected from the third speed to the fifth speed. Then, as a result of a discrimination in the above-described selecting treatment that SH=SO=the fifth speed, Smap becomes the fifth speed. At step Y7, a discrimination is made that SO=Smap, and the program proceeds to step Y5, where the vehicle speed is maintained to the fifth speed.

If Smap changes in the order of the fifth speed, the third speed and the fourth speed as described above, a speed changing was conventionally made by downshifting from the fifth speed to the third speed and subsequently upshifting from the third speed to the fourth speed. In this arrangement, however, the amount of power transmission decreases until the hydraulic engaging element C4 for the fourth speed has come into substantial engagement after downshifting to the third speed, followed by upshifting to the fourth speed. The duration of time of decreased amount of power transmission thus becomes long and the drivability becomes poor. On the contrary, according to the above-described embodying example, even if Smap is the fourth speed, upshifting is effected to the fifth speed that is designated as STC and that can be established from the viewpoint of speed change characteristics. Here, since the hydraulic clutches for the transmission trains that are designated as STC come into engagement with a good response, the period of decreased power transmission can be shortened and the drivability is improved.

The above-described discriminating treatments are repeated until a condition of TM=TM2 occurs. Even in case TM>TM2, if ECL falls within a predetermined region near 1 continuously for a predetermined period of time t, TM is reset to 0 by judging that the speed changing has substantially been completed. Therefore, next time, a discrimination is made at step Y4 that TM≦TM2 and the program proceeds to step Y5, so that the vehicle speed is maintained to the fifth speed as long as the vehicle runs at point B.

Thereafter, when the running condition transfers from point B to point E, since SL=the second speed and SH=Smap=the third speed at point E, a condition of SO≠Smap occurs and TM is set again to TMS. While TM>TM1, the program will proceed from step Y2 to step Y3 so as to make S=Smap=the third speed, thereby downshifting from the fifth speed to the third speed. If the vehicle is kept running at point E, while TM1≧TM>TM2, the program will proceed from step Y7 to step Y5. When a condition of TM≦TM2 has occurred, the program will proceed from step Y4 similarly to step Y5, thereby holding the vehicle speed to the third speed.

Then, when the running condition transfers: from point E to point A to attain a condition of SL=SH=Smap= the fifth speed, TM is again set to TMS. While TM> TM1, the program will proceed from step Y2 to step Y3 to attain a condition of S=Smap=the fifth speed, thereby upshifting from the third speed to the fifth speed. If the running condition transfers from point A to point F during the time of TM1≧TM>TM2 and while TC3 is above TCs to thereby attain a condition of SL=the first speed and SH=Smap=the second speed, a discrimination is made at step S7 that SO≠Smap. The program then proceeds to step S8, where a discrimination is made that there is STC (STC=the third speed, the fifth speed). The program proceeds to Y18 via steps of Y9, Y10, Y14 and Y17 to become S=STCmin=the third speed, thereby downshifting from the fifth speed to the third speed. Next time, a condition of SO=the third speed occurs, but since Smap is the second speed, the program proceeds from step Y7 to step Y18 via steps Y8, Y9, Y10, Y14 and Y17, thereby holding the vehicle speed to the third speed. By the way, when a downshifting is effected, the engine is in a highload condition due to the depression of the accelerator pedal. It follows that, even if the downshifting has been made to a transmission train that is designated as STC, when the difference between TM and TM2 is short, a condition of TM=TM2 may occur before the hydraulic engaging element of this transmission train has obtained an engaging force. Therefore, when a speed changing of downshifting is made while TM1≧TM>TM2, TM is set again to TM1 as described above so that enough time can be secured for establishing the transmission train of STC.

When ECL continuously falls within a predetermined range near 1 for a certain period of time t or a condition of TM=TM2 occurs with the result that TM is reset to 0, the program proceeds from step Y4 to step Y5 to become S= SO=the third speed. However, if the vehicle is kept running at point F, a condition of SO≠Smap occurs because Smap= the second speed, with the result that TM is set again to TMS. Next time, the program proceeds from step Y2 to step Y3 to become S=Smap=the second speed, thereby downshifting from the third speed to the second speed. A strong acceleration by the second transmission train can therefore be obtained as according to the speed change characteristics.

In the above-described embodying example, SL, SH and Smap have been arranged to be selected according to the speed change characteristics to be defined with the throttle opening degree and the vehicle speed as parameters. The present invention can also be applied to a case in which the speed change characteristics are corrected or Smap is changed based on an acceleration, the speed of depressing the accelerator pedal, running resistance or the like.

As can be seen from the above description, according to the present invention, the conditions of the hydraulic engaging elements are detected and the transmission train is determined by taking into consideration the results of this detection. The speed changing is thus made to the transmission train that can be established with a good response.

Therefore, the period of time of decreased amount of power transmission can be shortened to the smallest possible and the drivability can be improved.

It is readily apparent that the above-described control apparatus for a hydraulically operated vehicular transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a hydraulically operated vehicular transmission having a plurality of transmission trains to be established by a selective operation of a plurality of hydraulic engaging elements, comprising:

selecting means for selecting a transmission train according to a running condition of a vehicle;

detecting means for detecting a current power transmission capability value each of said hydraulic engaging elements, said power transmission capability value being variable depending supply or discharge of hydraulic oil to and from each of said hydraulic engaging elements; and transmission train determining means for determining a transmission train to be established based on a detected result of said detecting means and a selected result of said selecting means.

2. A control apparatus according to claim 1, wherein said selecting means compares speed change characteristics to be defined with an engine load and a vehicle speed as parameters and a present engine load and a present vehicle speed and selects one or a plurality of transmission trains that can be established from a viewpoint of the speed change characteristics.

3. A control apparatus according to claim 1, wherein a determination of a lowest speed transmission train by said transmission train determining means is prohibited so long as said selecting means has not selected the lowest speed transmission train of said transmission.

4. A control apparatus according to claim 1, wherein a transmission train to be established is determined based on the selected result of said selecting means until a predetermined time has lapsed from the time of speed change judgement by said selecting means.

5. A control apparatus according to claim 1, wherein a determination of a transmission train based on the detected result of said detecting means and the selected result of said selecting means is stopped at a predetermined time point after said speed change judgement by said selecting means and, instead, the transmission train to be established is determined by the selected result of said selecting means.

6. A control apparatus according to claim 5, wherein said predetermined time point is decided based on a time lapsed from the time of speed change judgement.

7. A control apparatus according to claim 6, wherein, when a speed changing for downshifting has been made before the lapse of a predetermined set time from the time of speed change judgement, the timing of stopping the determination of the transmission train based on the detected result of said detecting means and the selected result of said selecting means is delayed.

8. A control apparatus according to claim 5, wherein said predetermined time point is determined by a slipping condition of the hydraulic engaging element of the presently established transmission train.

9. A control apparatus according to claim 1, wherein said power transmission capability value of said hydraulic engaging element is a value corresponding to a hydraulic oil pressure that operates on the hydraulic engaging element.

10. A control apparatus according to claim 1, wherein said power transmission capability value of said hydraulic engaging element is a value corresponding to a response time for said hydraulic engaging element to transfer to an engaged condition in which the driving power can be transmitted thereby.

11. A control apparatus according to claim 1, wherein said power transmission capability value of said hydraulic engaging element is a value that increases with the lapse of time at a predetermined rate with respect to a hydraulic engaging element for a presently established transmission train and a value that decreases with the lapse; of time at a predetermined rate with respect to a hydraulic engaging element for a transmission train that is not presently established.

12. A control apparatus according to claim 11, wherein an upper limit value and a lower limit value of said power transmission capability value are determined.

13. A control apparatus according to claim 12, wherein said upper limit value is variably set according to a control condition of hydraulic control means which controls a supply pressure of hydraulic oil to be supplied to the hydraulic engaging elements.

14. A control apparatus according to any one of claims 1, 2, 3, 4, 5, 6, 7, 8, 9, 10, 11, 12 and 13 wherein said detecting means detects a hydraulic engaging element whose power transmission capability value is above a predetermined value and designates a transmission train that corresponds to said detected hydraulic engaging element, and wherein said transmission train determining means determines a transmission train to be established based on the transmission train designated by said detecting means and the transmission train or trains selected by said selecting means.

15. A control apparatus according to claim 14, wherein, at the time of speed change judgement in which a transmission train or trains which are different from a presently established transmission train have been selected by said selecting means, if there is a coinciding transmission train that coincides with the transmission train designated by said detecting means among the selected transmission trains, said transmission trains determining means determines the coinciding transmission train as a transmission train to be established.

16. A control apparatus according to claim 15, wherein, at the time of speed change judgement for upshifting, if there are a plurality of coinciding transmission trains, a lowest speed transmission train among the coinciding transmission trains is determined as a transmission train to be established.

17. A control apparatus according to claim 15, wherein, at the time of speed change judgement for downshifting, if there are a plurality of coinciding transmission trains, a highest speed transmission train among the coinciding transmission trains is determined as a transmission train to be established.

18. A control apparatus according to claim 14 wherein, at the time of speed change judgement in which transmission trains which are different from a presently established transmission have been selected by said selecting means, if there is no transmission train coinciding with the transmission train that has been designated by said detecting means among the selected transmission trains and if the presently established transmission trains or an intermediate transmission train between the presently established transmission train and the selected transmission train has been designated by said detecting means, the transmission train that has been designated by said transmission train determining means is determined as a transmission train to be established.

19. A control apparatus according to claim 18, wherein, at the time of speed change judgement for upshifting, if the designated transmission train is present in a plurality of numbers, a highest speed transmission train among the designated transmission trains is determined as a transmission train to be established.

20. A control apparatus according to claim 18, wherein, at the time of speed change judgement for downshifting, if the designated transmission train or trains are present in a plurality of numbers, a lowest speed transmission train among the designated transmission trains is determined as a transmission train to be established.

* * * * *

UNITED STATES PATENT AND TRADEMARK OFFICE
CERTIFICATE OF CORRECTION

PATENT NO.: 5,478,294
DATED : December 26, 1995
INVENTORS: Hideo FURUKAWA et al It is certified that error appears in the above-identified patent and that said Letters Patent is hereby corrected as shown below:

Column 13, Claim 1, line 26, after "depending" insert --on a--.

Column 14, Claim 11, line 20, after lapse, delete ";".

Signed and Sealed this

Third Day of September, 1996

Attest:

BRUCE LEHMAN

Attesting Officer

Commissioner of Patents and Trademarks